United States Patent
Eden et al.

(10) Patent No.: US 11,429,830 B2
(45) Date of Patent: Aug. 30, 2022

(54) SECURITY TAG HOLDER AND ASSEMBLY FOR USE WITH PACKAGE HAVING CURVED SURFACES

(71) Applicants: Keith C. Eden, Rockford, IL (US); Gregory A. Mackey, Painesville, OH (US)

(72) Inventors: Keith C. Eden, Rockford, IL (US); Gregory A. Mackey, Painesville, OH (US)

(73) Assignee: Fasteners for Retail, Inc., Twinsburg, OH (US)

( * ) Notice: Subject to any disclaimer, the term of this patent is extended or adjusted under 35 U.S.C. 154(b) by 0 days.

(21) Appl. No.: 17/182,509

(22) Filed: Feb. 23, 2021

(65) Prior Publication Data

US 2021/0279539 A1     Sep. 9, 2021

Related U.S. Application Data

(60) Provisional application No. 62/985,681, filed on Mar. 5, 2020.

(51) Int. Cl.
| | |
|---|---|
| *G06K 19/07* | (2006.01) |
| *B65D 55/02* | (2006.01) |
| *G08B 13/02* | (2006.01) |

(52) U.S. Cl.
CPC ....... *G06K 19/0723* (2013.01); *B65D 55/028* (2013.01); *G08B 13/02* (2013.01)

(58) Field of Classification Search
CPC .......................... G06K 19/0723; B65D 55/028

USPC .......................................................... 235/382
See application file for complete search history.

(56) References Cited

U.S. PATENT DOCUMENTS

| | | |
|---|---|---|
| D337,067 S | 7/1993 | Patterson |
| D391,508 S | 3/1998 | Lucas |
| D422,487 S | 4/2000 | Khokhar |
| D445,682 S | 7/2001 | Michael et al. |
| D446,118 S | 8/2001 | Michael et al. |
| D459,206 S | 6/2002 | Caveney et al. |
| 6,604,643 B1 | 8/2003 | Michael et al. |
| 6,769,557 B2 | 8/2004 | Michael et al. |
| 6,912,878 B2 | 7/2005 | Belden |
| 7,004,340 B2 | 2/2006 | Belden |
| 7,007,523 B2 | 3/2006 | Belden |
| D520,393 S | 5/2006 | Darby |
| 7,100,783 B2 | 9/2006 | Belden |
| 7,100,784 B2 | 9/2006 | Belden |
| D534,822 S | 1/2007 | Wadda |
| D535,205 S | 1/2007 | Frederick et al. |
| 7,259,967 B2 | 8/2007 | Marsilio et al. |
| 7,350,652 B2 | 4/2008 | Belden |

(Continued)

*Primary Examiner* — Allyson N Trail
(74) *Attorney, Agent, or Firm* — Reinhart Boerner Van Deuren P.C.

(57) ABSTRACT

A security tag holder including a flexible attachment member and a holder body is provided. The holder body defines a central cavity for holding a security tag. The holder body includes a pair of angled wings on opposed ends of the holder body. The angled wings are oriented to cooperate with the non-flat outer periphery of a product. The angled wings extend rearward of a back of the holder body. The holder body includes a rear opening in the back thereof for extension of a push button therethrough. A security tag assembly including the security tag is provided.

19 Claims, 15 Drawing Sheets

(56) References Cited

U.S. PATENT DOCUMENTS

| | | | |
|---|---|---|---|
| 7,350,653 B2 | 4/2008 | Belden | |
| 7,350,654 B2 | 4/2008 | Belden | |
| 7,350,655 B2 | 4/2008 | Belden | |
| 7,397,375 B2 | 7/2008 | Marsilio et al. | |
| 7,463,152 B2 | 12/2008 | Marsilio et al. | |
| 7,486,190 B2 | 2/2009 | Marsilio et al. | |
| 7,492,263 B2 | 2/2009 | Marsilio et al. | |
| 7,492,264 B2 | 2/2009 | Marsilio et al. | |
| 7,492,265 B2 | 2/2009 | Marsilio et al. | |
| 7,498,944 B2 | 3/2009 | Marsilio et al. | |
| 7,498,945 B2 | 3/2009 | Marsilio et al. | |
| 7,552,048 B2 | 4/2009 | Belden | |
| 7,543,466 B2 | 6/2009 | Loughlin | |
| 7,602,297 B2 | 10/2009 | Marsilio et al. | |
| 7,650,768 B2 | 1/2010 | Fawcett et al. | |
| 7,984,629 B2 | 7/2011 | Xiaobin | |
| 8,274,391 B2 | 9/2012 | Yang | |
| 8,305,219 B2 | 11/2012 | Yang | |
| 8,528,372 B2 | 9/2013 | Nilsson | |
| 8,640,509 B2 | 2/2014 | Will | |
| D708,534 S | 7/2014 | Martin | |
| 8,938,997 B2 | 1/2015 | Piccoli | |
| 9,169,670 B2 | 10/2015 | Shute | |
| 9,404,291 B1 | 8/2016 | White | |
| 9,524,626 B2 | 12/2016 | Bruhwiler | |
| D807,877 S | 1/2018 | Iwamatsu et al. | |
| D815,551 S | 4/2018 | Taylor et al. | |
| D896,117 S | 9/2020 | Nagel et al. | |
| 11,087,601 B1 | 8/2021 | Ewing et al. | |
| 2004/0237267 A1* | 12/2004 | Copen | E05B 73/0064 24/704.1 |
| 2010/0154265 A1* | 6/2010 | Poulokefalos | G09F 3/14 40/661.05 |
| 2010/0253524 A1 | 10/2010 | Kolton et al. | |
| 2012/0031980 A1* | 2/2012 | Tiedmann | G08B 13/2434 206/307 |
| 2015/0287299 A1* | 10/2015 | Eckert | G08B 13/1418 340/568.2 |
| 2021/0355715 A1 | 11/2021 | Eden et al. | |

\* cited by examiner

SECURITY TAG HOLDER AND ASSEMBLY FOR USE WITH PACKAGE HAVING CURVED SURFACES

CROSS-REFERENCE TO RELATED PATENT APPLICATIONS

This patent application claims the benefit of U.S. Provisional Patent Application No. 62/985,681, filed Mar. 5, 2020, the entire teachings and disclosure of which are incorporated herein by reference thereto.

FIELD OF THE INVENTION

This invention generally relates to retail merchandise security devices, and more particularly to retail merchandise security devices which are affixed to retail merchandise to provide anti-theft functionality.

BACKGROUND OF THE INVENTION

There are various methods and devices employed by retail establishments to deter or prevent retail theft. One common approach is to affix a security device directly to a product. Such security devices employ some mode of anti-theft functionality. As one example, it is known to affix an RFID tag directly to a product. A gate is positioned at an exit point of the retail establishment. If the RFID passes through the gate without being deactivated, an alarm will sound. Such RFID tags are oftentimes a small tag with an adhesive back which is adhered directly to a product or its packaging.

However, some packaging does not readily allow for the use of such tags. Indeed, it is not uncommon to utilize shrink wrap on the exterior of a package. Such a packaging arrangement is provided at the source and thus the retail establishment must accommodate their security device to this packaging. Adhesive back RFID tags are not readily employed in such a configuration as they would need to be adhered to the shrink wrap, which can be easily removed in-store by a would be thief.

To address this, there are security devices which are referred to in the art as box wraps. Such box wraps include a central hub housing an anti-theft arrangement and a spool. A cable of fixed length is attached to the spool at both ends thereof. As a result, a loop of cable may be drawn from or taken up by the central hub. The loop is first enlarged and merchandise is passed through the loop. The loop is then taken up by the spool so that the cable is tightly wound around the merchandise such that the security device is effectively affixed to the merchandise. There is typically a locking mechanism within the central hub which prevents the loop from being enlarged again which would otherwise allow for the unwanted removal of the security device. Once activated, the device will sound an alarm if not deactivated, and or, if the device is tampered with, e.g. the cable loop is cut.

While such devices have proven to be effective, they are not without their drawbacks. Such box wrap style security devices are typically designed with two loops arranged perpendicular to one another, and are thus designed to accommodate only generally square or rectangular packaging. These devices are often not suitable for use with round packaging such as bottles.

Yet further, the anti-theft componentry is contained within the central hub. If a retail establishment wishes to change their anti-theft methodology to something which is not compatible with the anti-theft componentry of their existing devices, their existing security devices are rendered entirely obsolete.

There is thus a need in the art for improvements in such security devices.

BRIEF SUMMARY OF THE INVENTION

In one implementation, a security tag holder including a flexible attachment member and a holder body is provided. The holder body defines a central cavity for holding a security tag. The holder body includes a pair of angled wings on opposed ends of the holder body. The angled wings are oriented to cooperate with the non-flat outer periphery of a product. The angled wings extend rearward of a back of the holder body. The holder body includes a rear opening in the back thereof for extension of a push button therethrough.

In one implementation, the attachment member and holder body are formed as an integral unit from a continuous piece of material. For example, the entire unit may be formed form silicone and particularly injection molded silicone.

In one implementation, the flexible attachment member forms a continuous unbroken flexible ring.

In one implementation, the flexible attachment member is formed from silicone.

In one implementation, the holder body has a front opening for providing access to the central cavity. This opening may be used to install a security tag into the central cavity.

In one implementation, the holder body is generally rectangular with the wings extending outward from opposed sides of the rectangular profile.

In one implementation, the angled wings are formed by part of the flexible attachment member.

In one implementation, the front opening has a greater cross-sectional area than the rear opening.

In one implementation, the flexible attachment member and the holder body have the same hardness.

In one implementation, the holder body is formed from a material that is more rigid than a material from which the flexible attachment member is formed. In an optional implementation, the flexible attachment member and the holder body are separate components.

In one implementation, the flexible attachment member and the holder body are secured to one another by mounting a security tag within the central cavity. In such an embodiment, the flexible attachment member may extend around a front face of the security tag with portions of the flexible attachment member being secured within gaps formed between the security tag and the holder body. Optionally, removal of the security tag from the hold body removes the flexible attachment member from the holder body as well.

In one implementation, the holder body has a pair of front openings formed in a front of the holder body. The front is opposite the back. The central cavity is formed between the front and the back. The pair of front openings are separated by a support strip extending between opposed sides of the holder body.

In one implementation, the flexible attachment member is a generally hoop shaped member. The hoop shaped member defines an opening therethrough. Product to which the device is mounted would extend through the opening in the hoop shaped member. The hoop shaped member defines a central axis (e.g. insertion axis). The support strip extends generally parallel to the central axis.

In one implementation, the holder body defines a generally annular sidewall. The annular sidewall has first and second opposed sidewall portions. The first sidewall portion has a first inward extending retaining flange. The second sidewall portion has a second inward extending retaining flange. The first and second inward extending retaining flanges extend towards one another. These flanges can be used to prevent a security tag from being pushed axially out of the holder body in a direction extending from the rear toward the front.

In an implementation, the retaining flanges are spaced forward of the back of the holder body.

In an implementation, the first sidewall portion includes a first inward extending retaining lug. The first inward extending retaining lug is rearwardly offset from the first inward extending retaining flange forming an axial attachment gap therebetween. The second sidewall portion includes a second inward extending retaining lug. The second inward extending retaining lug is rearwardly offset from the second inward extending retaining flange forming an axial attachment gap therebetween.

The retaining lugs may have a tapered surface to facilitate easier mounting of a security tag to the holder body.

In one implementation, the first inward extending retaining flange defines a notch aligned with the first inward extending retaining lug. The second inward extending retaining flange defines a notch aligned with the second inward extending retaining lug. These notches facilitate easier manufacturability, particularly when molding is used.

In one implementation, an inner surface of the angled wings is curved. This inner surface is the surface of the wings that faces the merchandise when mounted thereto.

In one implementation, the resilient attachment member may be positioned between the angled wings and the merchandise when mounted.

In one implementation, the device may include a security flange extending rearward from the holder body. The security flange and angled wings are configured such when that mounting of the holder body to a product with the angled wings proximate an outer sidewall of the product, the security flange will extend laterally over an end of the product.

In an implementation, a security tag assembly is provided. The assembly includes any previously described security tag holder and a security tag positioned therein.

In an implementation, the security tag includes a rearwardly extending contact button. The contact button extends through the rear opening and projecting from the back of the holder body. The holder body is configured such that the contact button projects sufficiently far to contact the merchandise when mounted thereto.

In an implementation, a security tag assembly includes a security tag holder as outlined above and a security tag. The security tag is positioned within the central cavity. The security tag includes a first attachment lug being positioned within the axial attachment gap between the first inward extending retaining flange and the first inward extending retaining lug. The security tag includes a second attachment lug being positioned within the axial attachment gap between the second inward extending retaining flange and the second inward extending retaining lug.

In an implementation of the security tag assemblies, the security tag is removably secured within the holder body of the security tag holder.

In one implementation, a retail merchandise package and security device is provided. The retail merchandise includes packaging having a rounded outer surface. The security tag assembly may be of any of the previously described. The angled wings of the holder body cooperate with the rounded outer surface of the retail merchandise package. This cooperation can stabilize the mounting of the security tag relative to the rounded outer surface.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
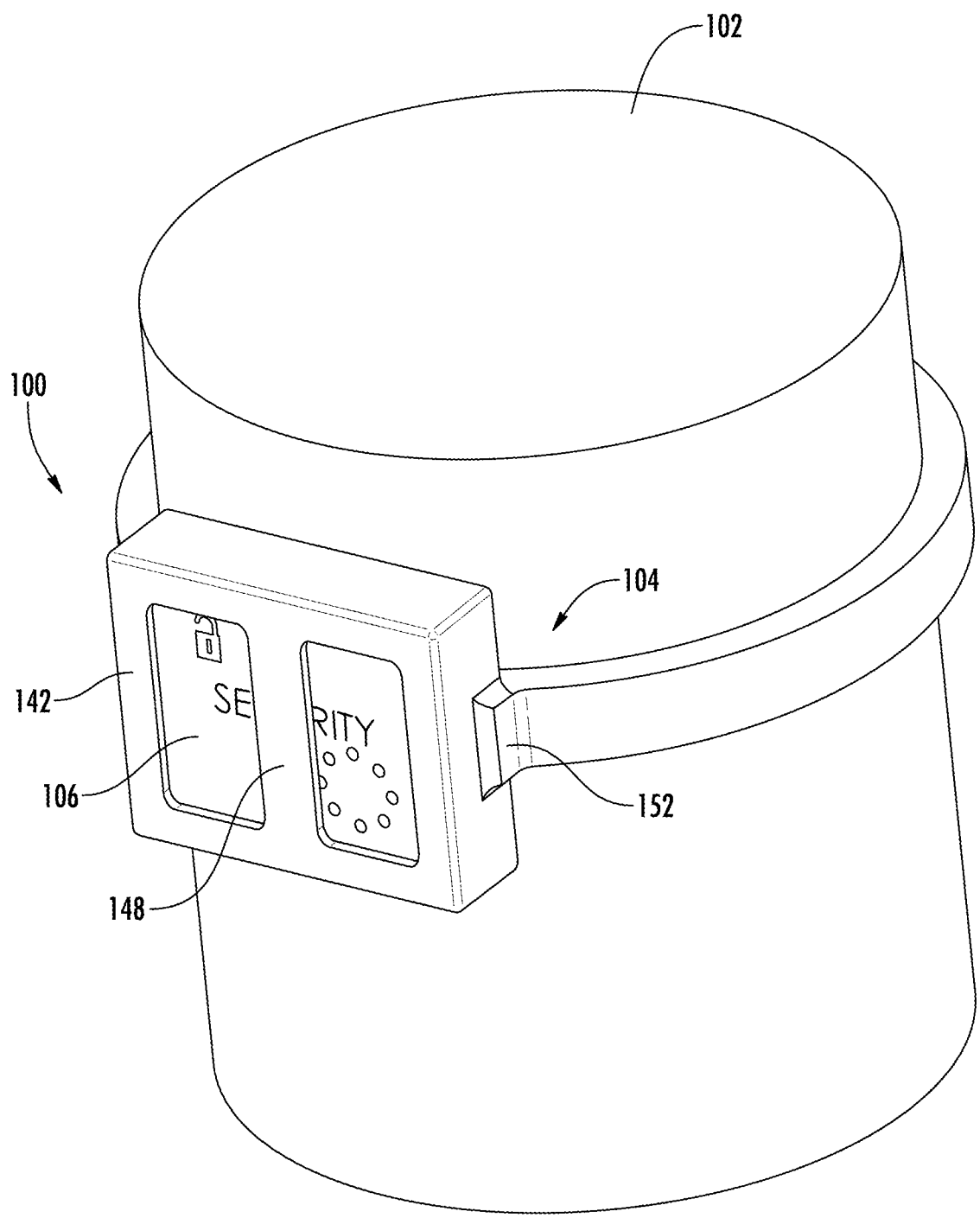
FIG. 1 is a perspective illustration of a security tag assembly according to an embodiment of the application attached to merchandise.
Figure 2:
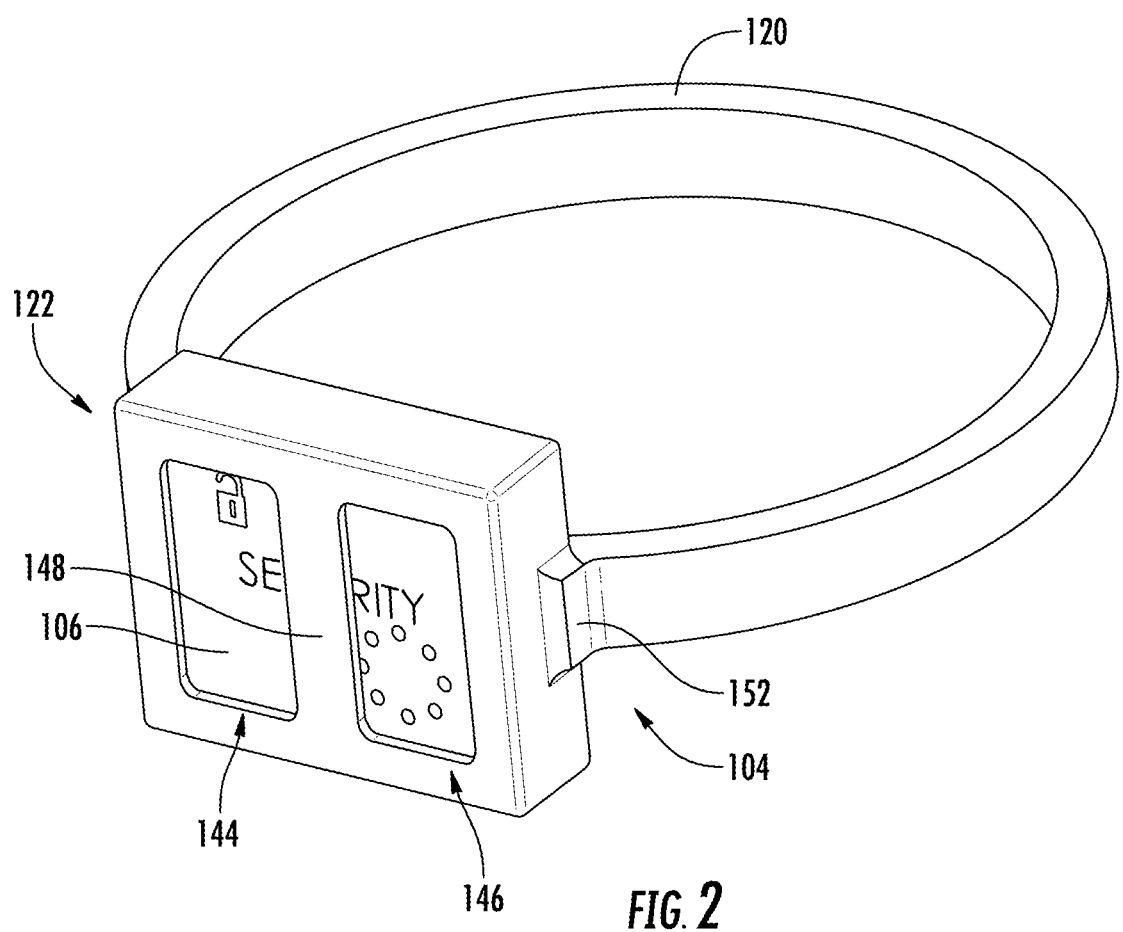
FIG. 2 is a front perspective illustration of the security tag assembly removed from the merchandise.

FIG. 1 illustrates a first embodiment of a security tag assembly 100 attached to an item of merchandise 102 according to teachings of the present application. The security tag assembly 100 finds particularly advantage when used with merchandise such as bottles, coffee mugs or other similarly shaped objects. The security tag assembly 100 is a loss prevention device that is typically used in a retail environment to help combat theft of the merchandise 102.

The security tag assembly 100 includes a security tag holder 104 and an anti-theft device in the form of a security tag 106. The security tag holder 104 is configured to mount the security tag 106 to merchandise 102. As noted above, the security tag holder 104 finds particular applicability to round or similarly shaped merchandise 102 (e.g. merchandise that does not have a flat surface to apply the security tag. The security tag assembly 100 is configured such that removal of the security tag assembly 100 or at least the security tag 106 from the merchandise 102 will generate some sort of alarm signal indicating potential theft of merchandise 102. In other embodiments, the security tag 106 may be a security device that when passed through a security gate or taken a predetermined distance away from a security base an alarm signal will be generated. The security tag 106 may relay a message to a separate security unit or system that can be used to alert security personnel. In some instances, the security tag 106 may include other RFID technology or motion and/or light sensing technology to sense a potential theft event of merchandise 102.

Figure 3:
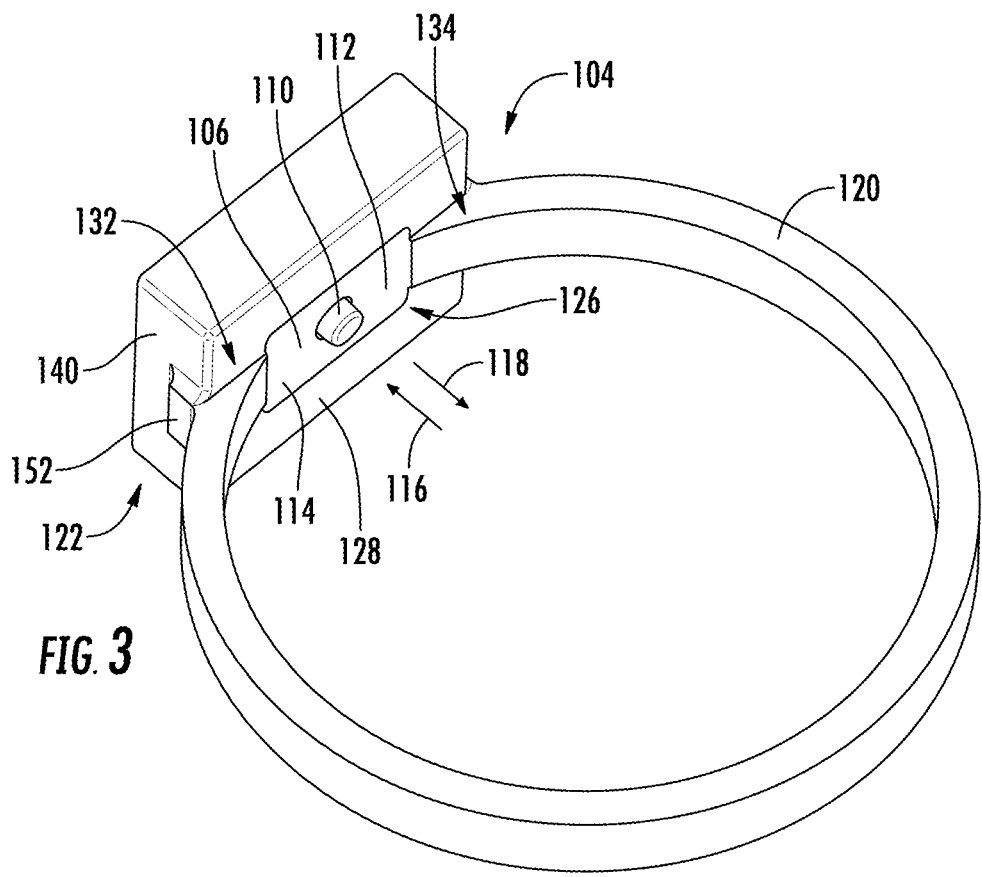
FIG. 3 is a rear perspective illustration of the security tag assembly of FIG. 2.
Figure 4:
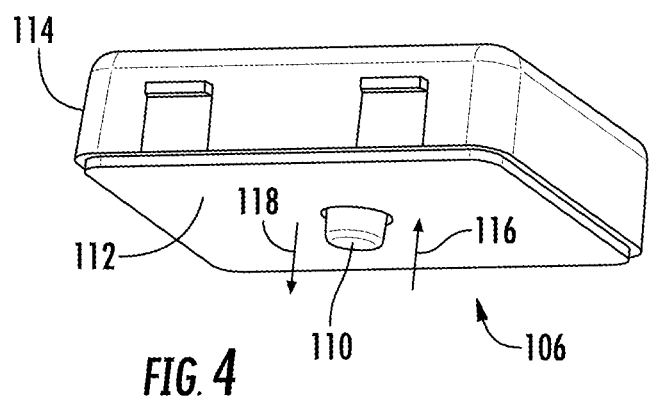
FIG. 4 is bottom perspective illustration of a security tag for use in the security tag assembly of FIG. 2.
Figure 5:
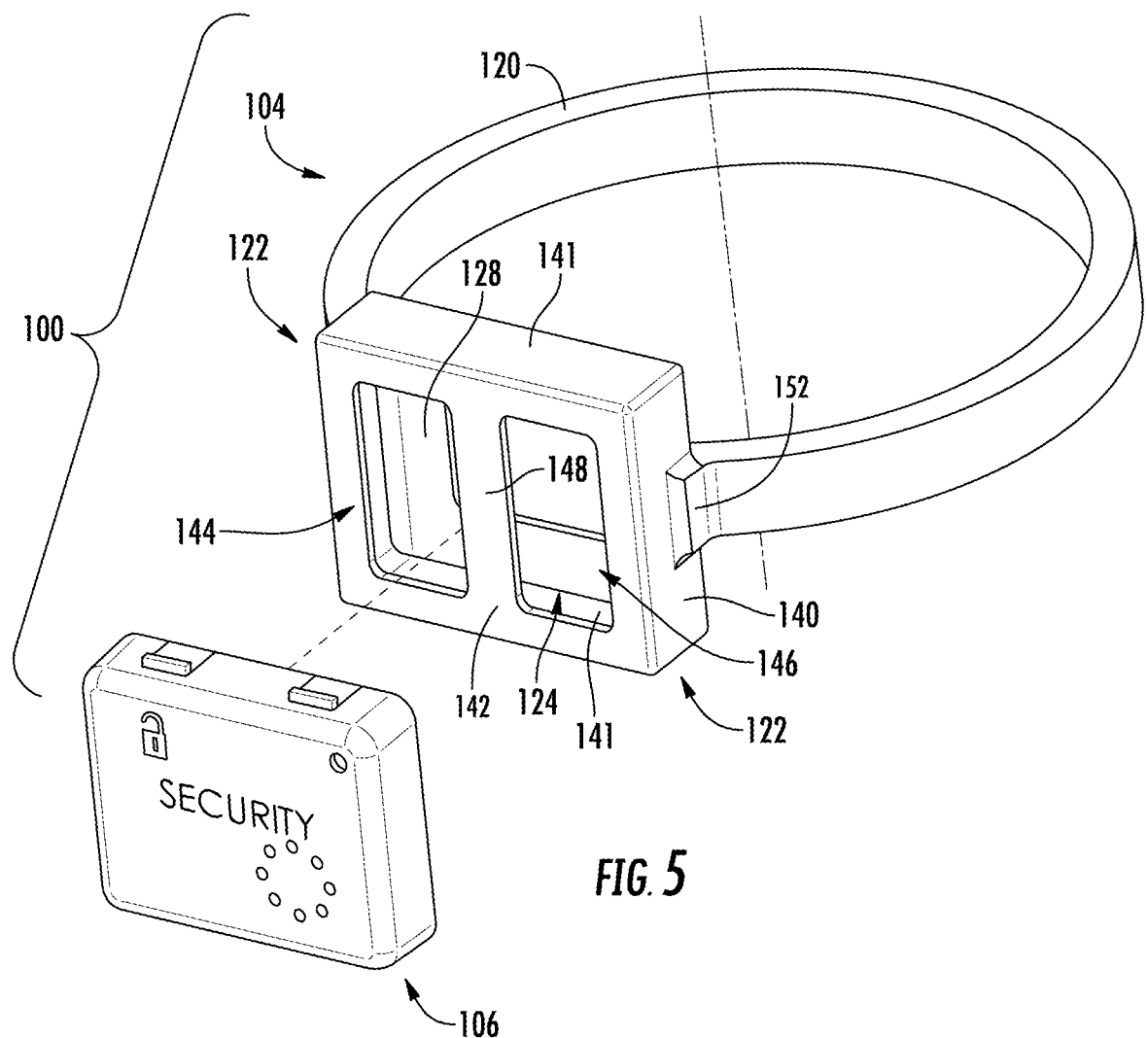
FIG. 5 is perspective exploded illustration of the security tag assembly of FIG. 2.
Figure 6:
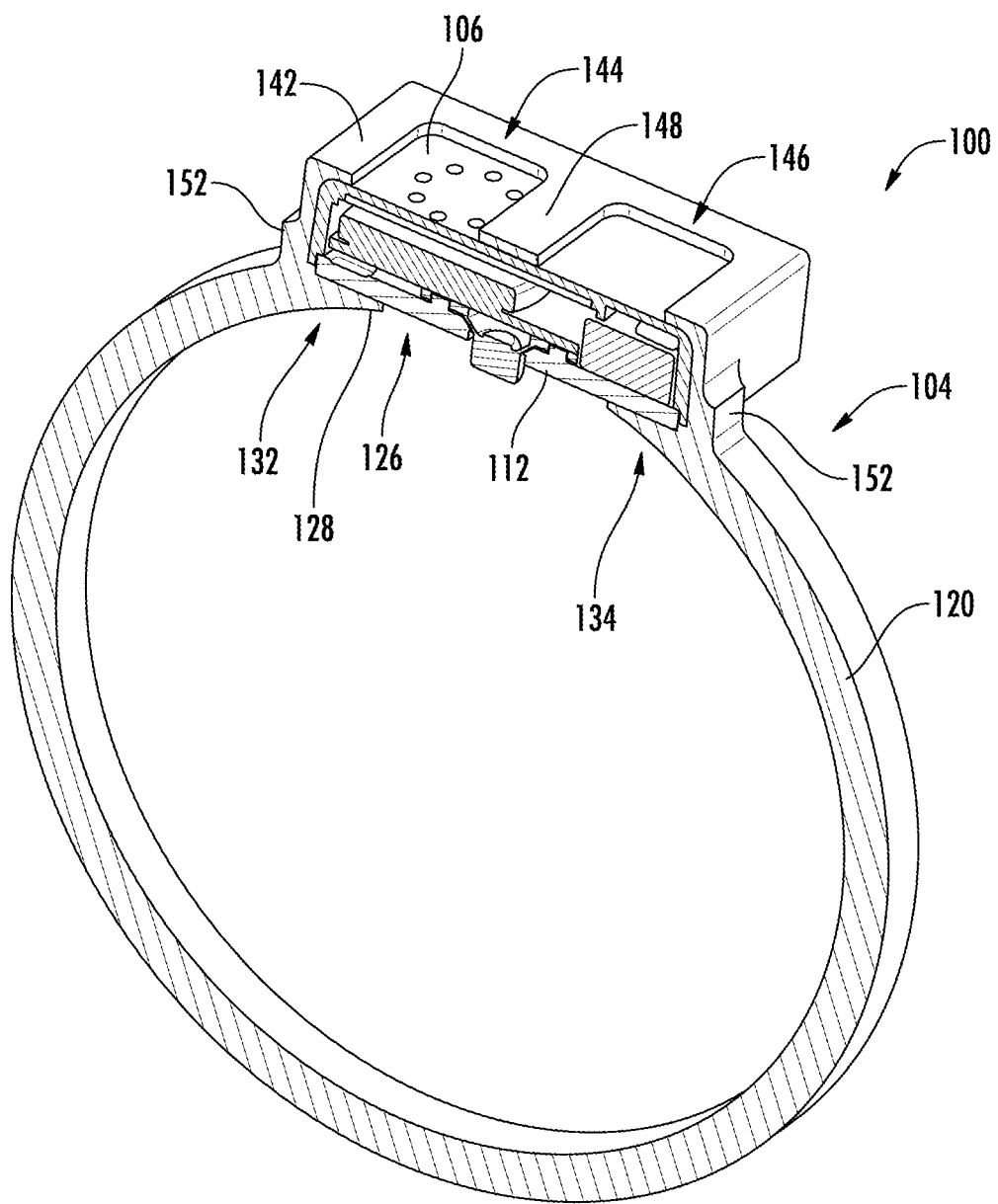
FIG. 6 is a cross-sectional illustration of the security tag assembly of FIG. 2.
Figure 7:
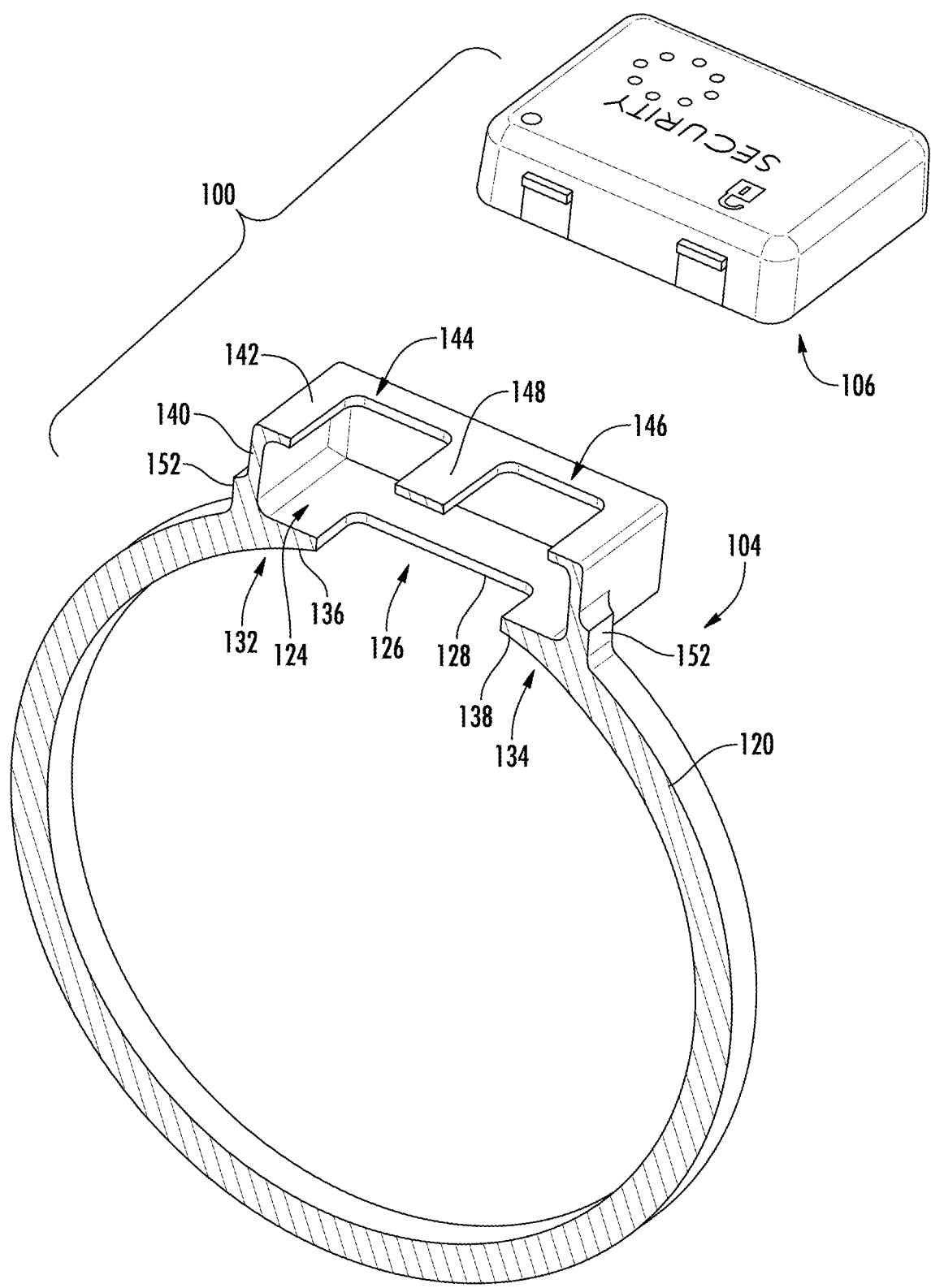
FIGS. 7 and 8 are an exploded cross-sectional illustrations of the security tag assembly of FIG. 2.
Figure 8:
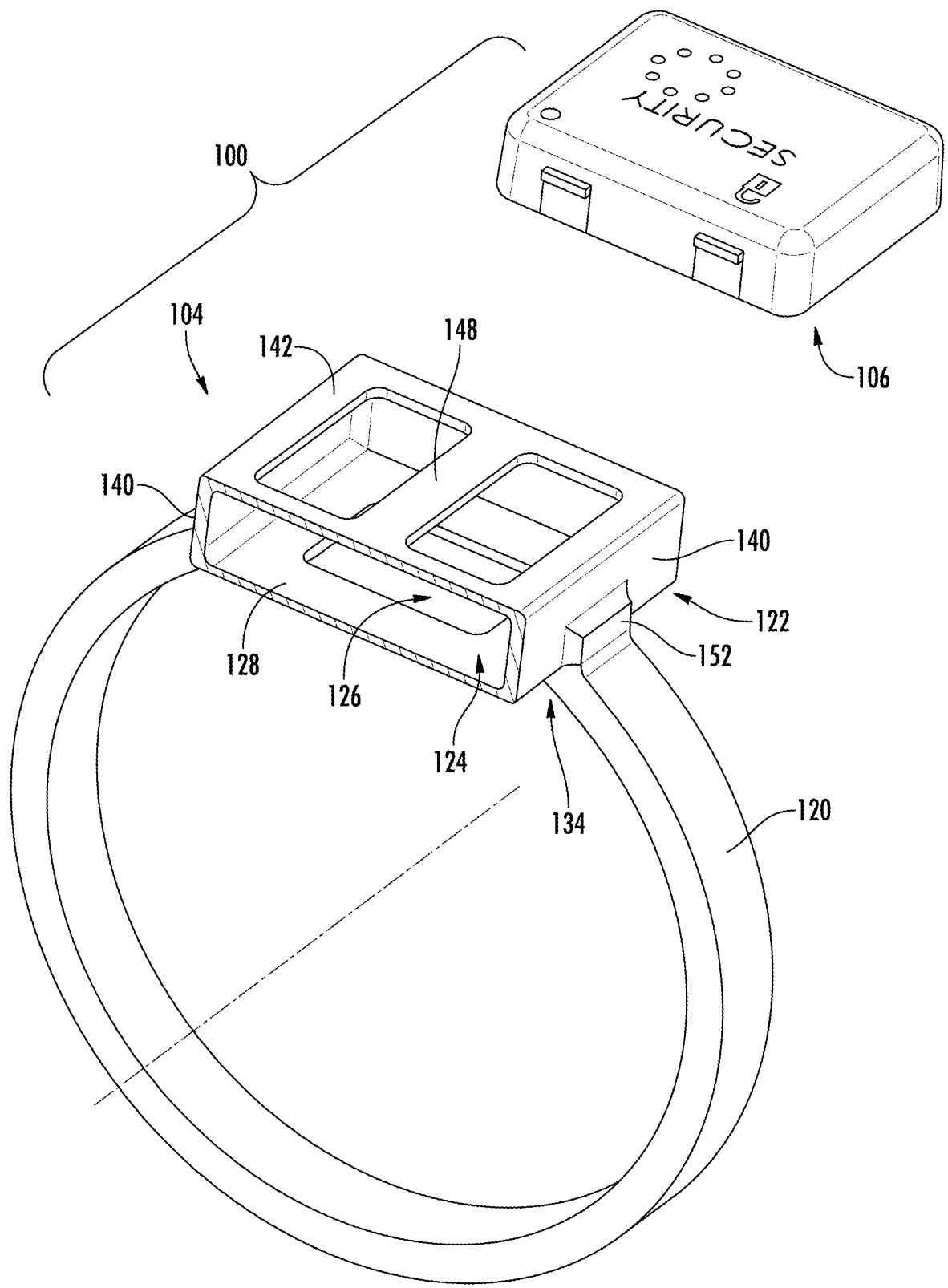

In the illustrated embodiment, the security tag 106 includes a contact post 110 that, when removed from merchandise 102, projects from a back 112 of the housing 114 of the security tag 106, represented by arrow 118 in FIGS. 3 and 4. When pressed against merchandise 102, the post 110 is pushed into housing 114, represented by arrow 116. When in an activated state and pressed against the merchandise 102, the security tag 106 does not generate a signal indicating a potential theft event. However, when removed from contact with the merchandise 102 such that the post 110 is permitted to move out of housing 114 (e.g. illustrated by arrow 118), the signal corresponding to a potential theft event is generated.

This signal could be flashing lights, generation of sound, a signal to another security unit, etc.

The security tag holder 104 is configured to mount the security tag 106 to merchandise 102 in such a manner that the contact post 110 is sufficiently depressed into housing 114 such that the no signal corresponding to a potential theft activity is generated.

FIGS. 2-8 illustrate the security tag holder. The security tag holder 104 includes a flexible attachment member in the form of a flexible band 120. The flexible band 120 allows the security tag holder to be mounted to merchandise 102. The flexible band 120 is sufficiently flexible and resilient that it can be stretched and then released to secure the security tag assembly 100 to merchandise 102. This finds particular use for round, oval, obround or similarly shaped containers such as bottles, mugs, etc.

The security tag holder 104 further includes holder body 122 in which the security tag 106 is housed in use. The holder body 122 is shaped to match the outer peripheral shape of the housing 114 of the security tag 106.

The holder body 122 defines a central cavity 124 in which the security tag 106 is housed. The holder body 122 includes a rear opening 126 (see e.g. FIG. 3) through which contact post 110 extends such that it can contact merchandise 102. In this embodiment, the rear opening 126 is formed in a back wall 128 of the holder body 122.

The holder body 122 includes a pair of angled wings 132, 134. The inner surface 136, 138 of the angled wings 132, 134 help locate the holder body 122 relative to the outer peripheral surface of merchandise 102 and particularly when the outer surface is non-flat such as curved, such as in a cylindrical merchandise package. More particularly, the angled wings 132, 134 prevent rocking of the security tag 106 on a curved or otherwise non-flat portion of the outer periphery of a package, notably, curved is a subset of non-flat packaging. In one embodiment, the inner surfaces of the angled wings 132, 134 are curved to help orient the holder body 122 relative to merchandise 102.

In an embodiment, the angled wings, measured at the rear surfaces thereof, extend at an angle of greater than 90 degrees, more preferably greater than 110 degrees and more preferably between 135 and 175 degrees relative to the rear of the holder body 122.

The angled wings 132, 134 are located at opposed ends of the holder body 122 and rearward relative to back wall 128.

The wings 132, 134, in this embodiment, may be considered part of the flexible ring 120.

The holder body 122 includes a generally annular sidewall 140 that includes sidewall portions. The holder body 122 also includes a top wall 142 that is spaced apart form back wall 128. The annular sidewall 140 connects back wall 128 to top wall 142 with the cavity 124 formed axially therebetween and being surrounded by annular sidewall 140.

Top wall 142 includes a pair of front openings 144, 146 that are separated by support strip 148 that extends laterally between opposed sidewall portions of the annular sidewall 140. In this embodiment, the support strip 148 extends longitudinally generally parallel to a central axis 150 defined by the flexible band 120. The support strip 148 helps prevent the interconnected opposed sidewall portions 141 from flexing laterally away from one another, which could allow the security tag 106 to become dislodged from holder body 122.

In a preferred implementation, openings 144, 146 are individually sized and the material forming the holder body 122 is sufficiently flexible such the security tag 106 can be inserted into cavity 124 through one of openings 144, 146.

In this embodiment, the holder body 122 and flexible band 120 are formed as unitary unit and more particularly as a single continuous piece of material. In a preferred implementation, the holder body 122 and flexible band 120 are formed from silicone or materials having similar flexibility characteristics.

In the illustrated implementation, the flexible band 120 is a continuous unbroken flexible ring.

Support ribs 152 extend laterally outward from opposed sidewall portions of annular sidewall 140. The support ribs 152 help support the adjacent sidewall portions to prevent or inhibit flexure thereof absent sufficient force. This prevents deformation of the annular sidewall. However, the support ribs 152 are sufficiently flexible to allow some deformation, such as when the user is installing the security tag 106.

In third embodiment, the support ribs 152 are thicker sections of the sidewall portions that align with flexible band 120. This arrangement is beneficial in the instances where the security tag holder 104 is formed by way of molding from a flexible material, such as injection molded silicone.

Figure 9:
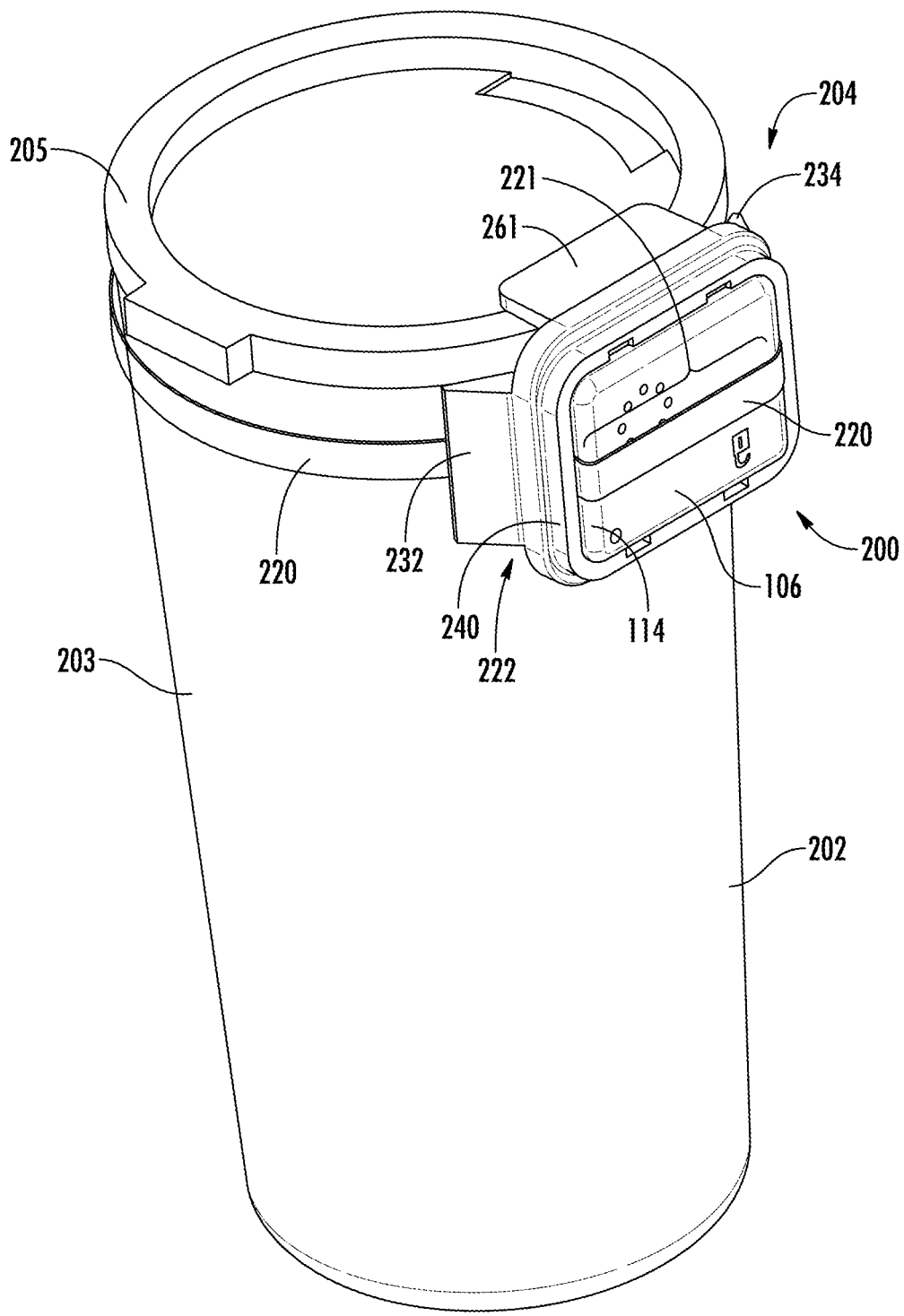
FIG. 9 is perspective illustration of a security tag assembly according to another embodiment of the application attached to merchandise in the form of a coffee mug.
Figure 10:
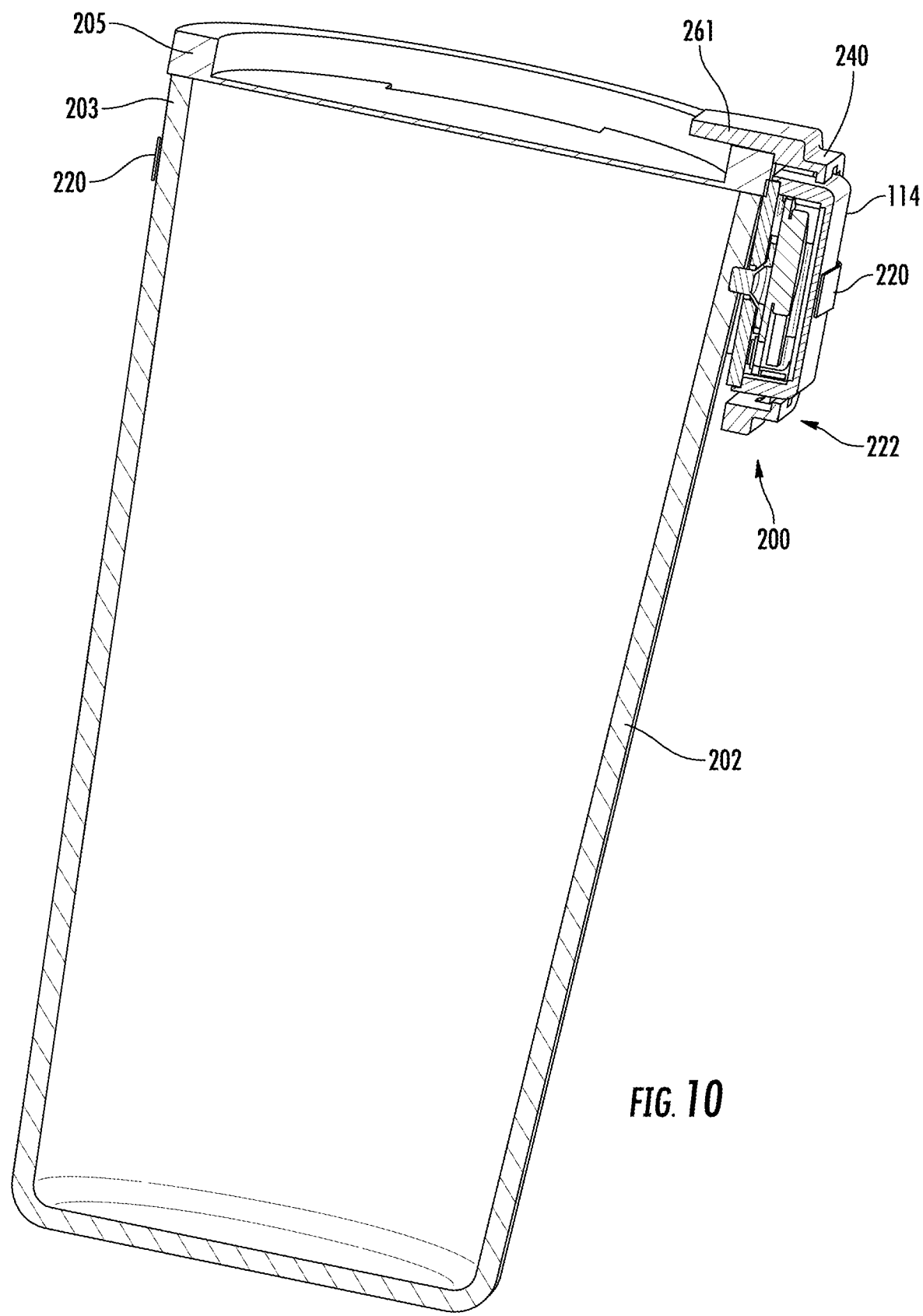
FIG. 10 is a cross-sectional illustration of the merchandise and security tag assembly of FIG. 9.
Figure 11:
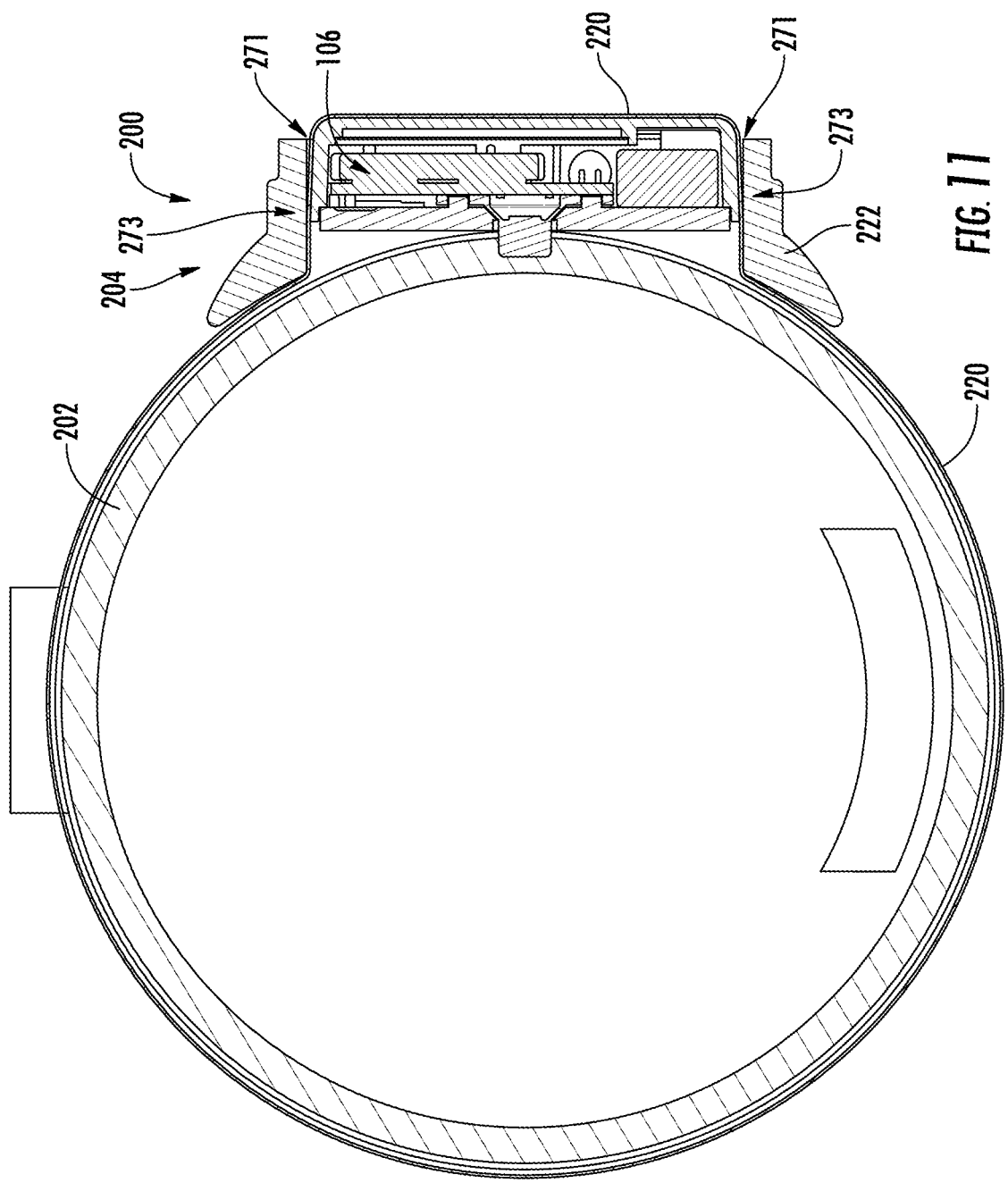
FIG. 11 is a cross-sectional illustration of the merchandise and security tag assembly of FIG. 9.

FIGS. 9-11 illustrate a further embodiment of a security tag assembly 200 mounted to merchandise 202 that has a generally circular outer periphery at the location of attachment of the security tag assembly 200. FIGS. 12-17 illustrate the security tag holder 204 removed from merchandise 202.

This embodiment also includes a flexible attachment member. The flexible attachment member is in the form of a flexible band 220 that is a separate component from the holder body 222, unlike the prior embodiment.

The holder body 222 again includes a rear opening to provide access to contact post 110 of the security tag 106.

The holder body 222 includes opposed angled wings 232, 234 that extend rearward from a back of the holder body 222 as well as laterally outward from opposed sides of the holder body 222. Again, the angled wings 232, 234 have an inner surface that is tapered to help wrap around the cylindrical/circular merchandise 202. It is preferred if the inner surfaces of the wings 232, 234 are curved to better locate the holder body 222 relative to the merchandise 202.

The holder body 222 includes a generally annular sidewall 240 that bounds central cavity 224 in which the security tag 106 is located in use.

Figure 12:
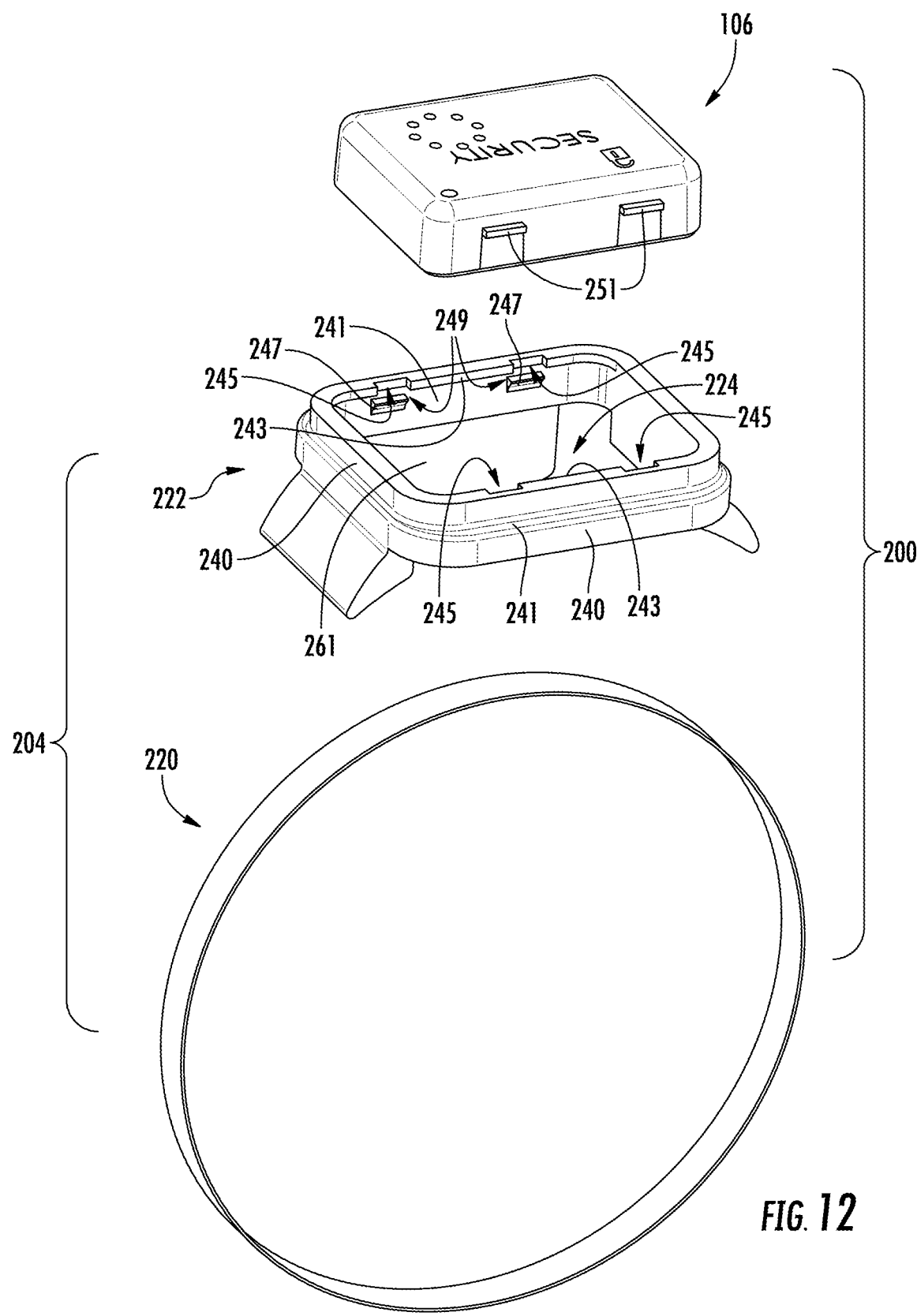
FIGS. 12 and 13 is an exploded illustration of the security tag assembly of FIG. 9.

With reference to FIG. 12, the annular sidewall 240 is generally rectangular when viewed from the front and has two sets of opposed sidewall portions. In this embodiment, one set of opposed sidewall portions includes mounting features for securing the security tag 106 within cavity 224.

Opposed sidewall portions 241 have inward extending retaining flanges 243. The retaining flanges 243 extend inward toward one another. The underside of the retaining flanges 243 create abutments for securing the security tag 106 within cavity 224.

In this implementation, the inward extending retaining flanges 243 are each formed from a plurality of aligned flange segments. Notches 245 are formed between adjacent flange segments. Further, the inward extending retaining flanges 243 define in part the front face of the holder body 222. However, other embodiments could have the flanges 243 recessed and spaced away from the front face.

Offset toward the back of the holder body 222 are inward extending retaining lugs 247. The rearward offset of the retaining lugs 247 from the retaining flanges 243 forms axial attachment gap 249 therebetween. In this implementation, the retaining lugs 247 are spaced forward of the back or rear of the holder body 222.

Retaining lugs 247 of one of the opposed sidewall portions 241, again, extend inward toward the retaining lugs 247 of the other opposed sidewall portion 241.

Notches 245 are aligned with retaining lugs 247. Typically, the width of the notches 245 is greater than or equal the width of retaining lugs 247. This allows for improved injection molding and particularly improved mold half separation after molding.

The security tag 106 includes outward extending attachment lugs 251. The attachment lugs 251 extend into gaps 249. The attachment lugs 251 are captured between lugs 247 and retaining flanges 243 for securing the security tag 106, releasably, within holder body 222. The width of the attachment lugs 251 is preferably greater than the width of the notches 245. However, it is possible for the width of the attachment lugs 251 of the security tag 106 to be smaller than the width of the notches if the attachment lugs 251 are positioned to at least align with portions of flanges 243 and portions of lugs 247.

Preferably, lugs 247 included tapered surfaces for improved mounting of the security tag 106. In a preferred implementation, the surfaces taper inward when moving in a direction from the rear of the holder body 222 toward a front of the holder body 222.

Figure 13:
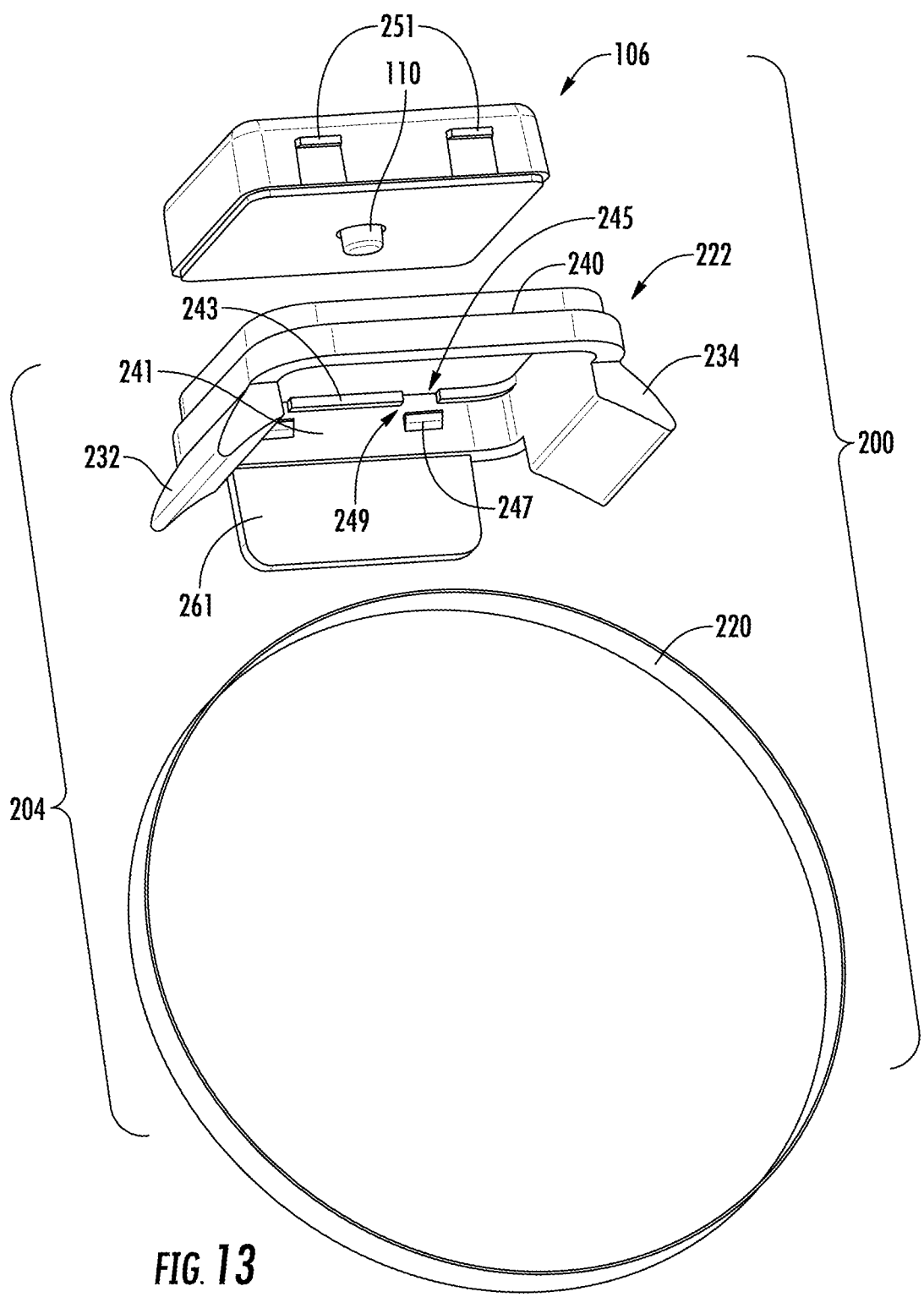
Figure 14:
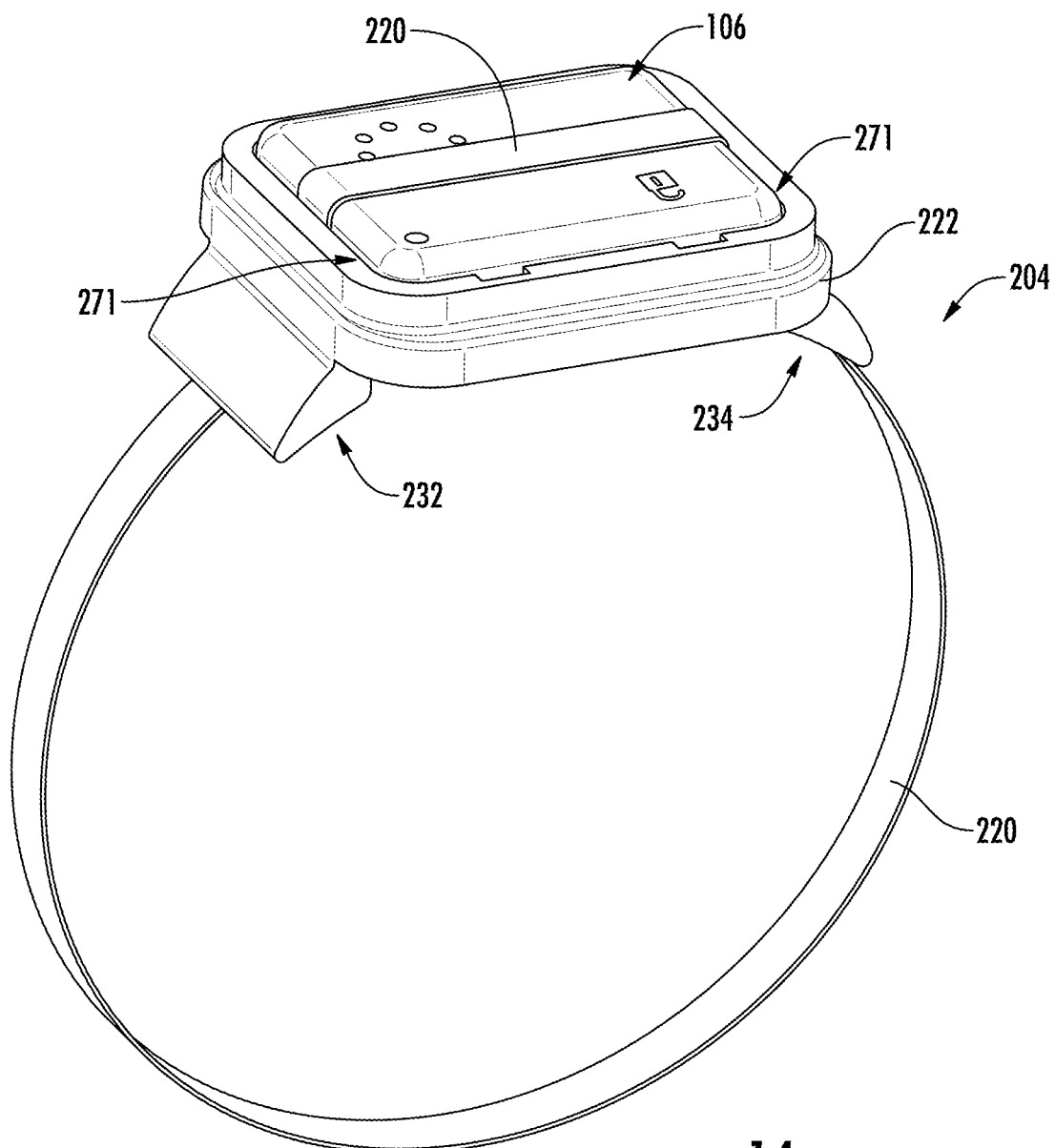
FIG. 14 is perspective illustration of the security tag assembly of FIG. 9 removed from the merchandise.
Figure 15:
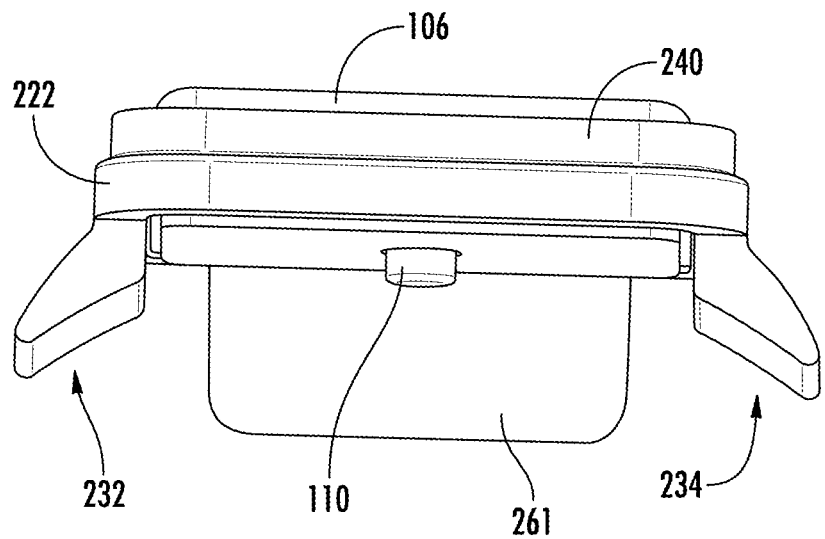
FIG. 15 is a perspective illustration of the security tag and the security tag holder of the security tag assembly of FIG. 9.

With reference to FIGS. 9, 10 and 13, a security flange 261 extends rearward from the holder body 222 and particularly from one of the sidewall portions 241 of annular sidewall 240. The security flange 261 is used to secure components of the merchandise 202 to the portion of the merchandise to which the security tag assembly 200 is mounted.

More particularly, in the illustrated implementation, merchandise 202 includes a main body 203 and a lid 205. The flexible band 220 attaches the security tag assembly 200 to the main body 203. Security flange 261 extends axially over lid 205. As such, if I thief attempts to remove lid 205 from main body 203, the security tag assembly 200 would be dislodged from main body 203 such that security tag 106 would generate the signal as discussed previously.

The angled wings 232, 234 and security flange 261 are configured (e.g. size and positioning) such that mounting of the holder body 222 to a merchandise 202 with the angled wings 232, 234 proximate an outer sidewall of the main body 203, the security flange 261 will extend laterally over the end of the merchandise 202 defined by lid 205.

In this embodiment, the holder body 222 is formed from a more rigid material than the flexible band 220. For example, flexible band 220 may be a rubber or silicone band while holder body 222 is formed from a more rigid plastic material.

With reference to FIGS. 9 and 11, 14 and 16-17, flexible band 220 extends around security tag 106 in this implementation. The flexible band 220 extends through gaps 271 formed between annular sidewall 240 and the ends of the housing 114 of security tag 106. As such, two sections 273 of the flexible band 220 are positioned between the housing 114 of security tag 106 and adjacent sidewall portions of the annular sidewall 240.

Figure 16:
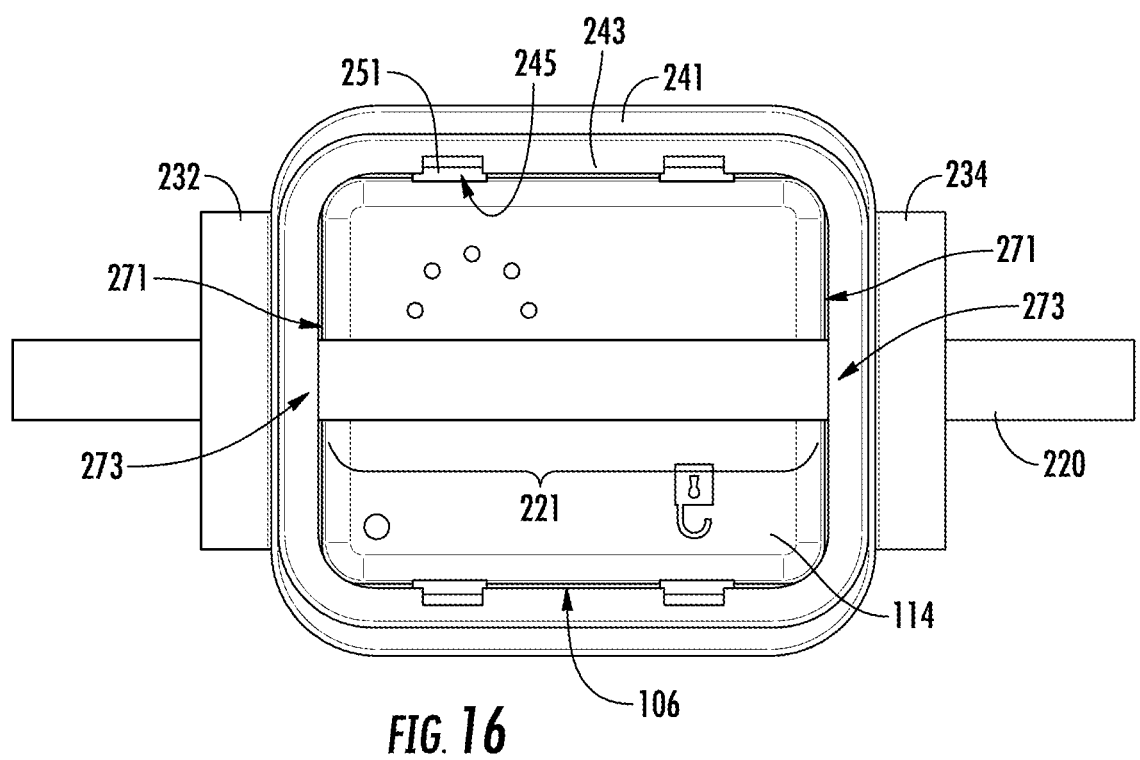
FIG. 16 is front view of the security tag assembly of FIG. 9.
Figure 17:
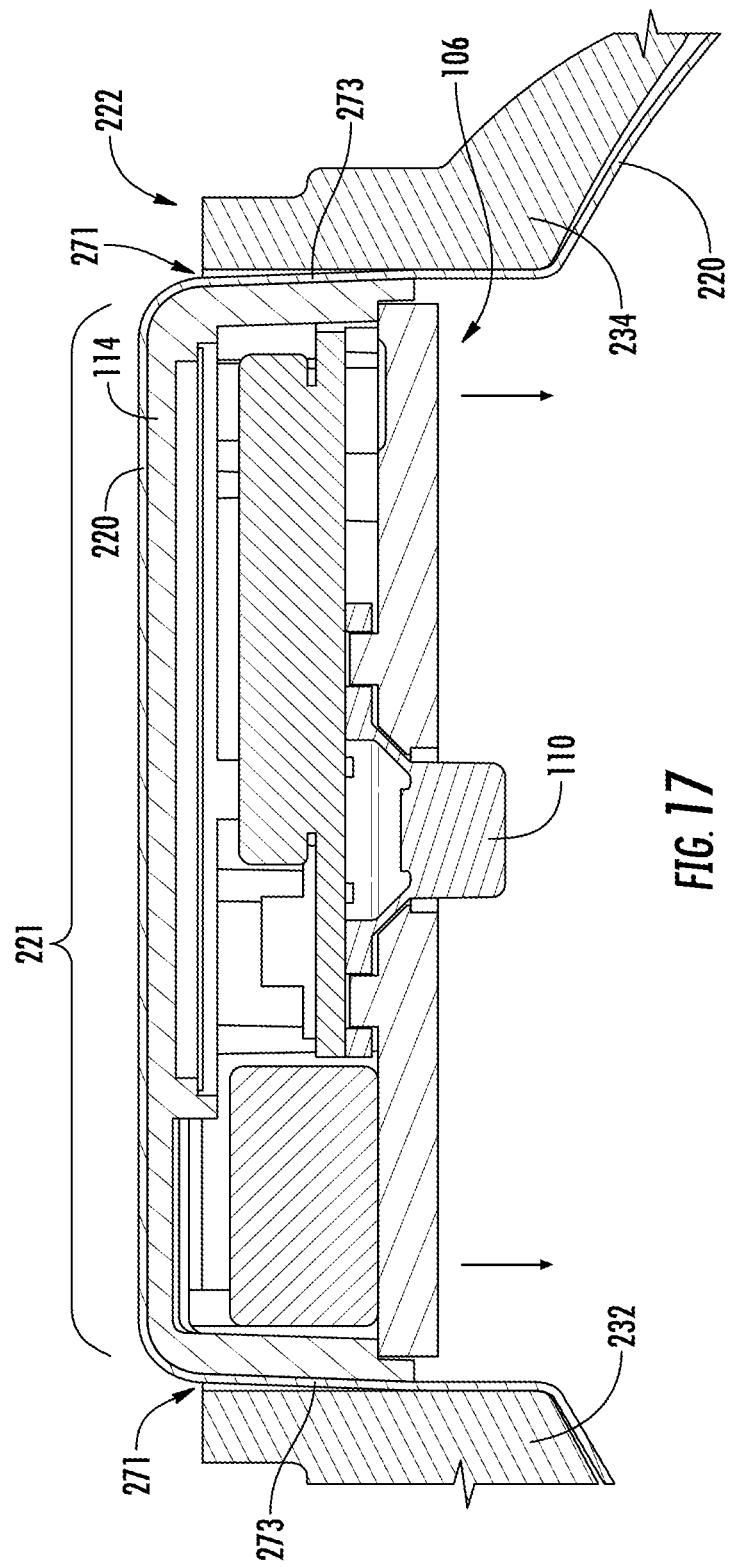
FIG. 17 is a cross-sectional illustration of the security tag assembly of FIG. 9.

Additionally, a portion of flexible band 220, e.g. portion 221 in FIG. 16, extends across a front face of security tag 106.

Further, these systems where the security tag 106 is removably mounted to tag holder allows for the system to be tailored to a particularly security system or for the security tags to be replaced without a complete change in the overall system. Further, if a security tag is broken or the battery dies, the security tag can be replaced while the security tag holder can be reused.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A security tag holder comprising:
a flexible attachment member;
a holder body defining a central cavity for holding a security tag, the holder body including a pair of angled wings on opposed ends of the holder body, the angled wings being oriented to cooperate with a portion of the outer periphery of product that is non-flat, the angled wings extending rearward of a back of the holder body, the holder body including a rear opening in the back thereof for extension of a push button therethrough;
wherein:
the holder body defines a generally annular sidewall, the annular sidewall having first and second opposed sidewall portions, the first sidewall portion having a first inward extending retaining flange, the second sidewall portion having a second inward extending retaining flange, the first and second inward extending retaining flanges extending towards one another;
the retaining flanges are spaced forward of the back of the holder body;
the first sidewall portion includes a first inward extending retaining lug, the first inward extending retaining lug being rearwardly offset from the first inward extending retaining flange forming an axial attachment gap therebetween; and
the second sidewall portion includes a second inward extending retaining lug, the second inward extending retaining lug being rearwardly offset from the second inward extending retaining flange forming an axial attachment gap therebetween.

2. The security tag holder of claim 1, wherein the attachment member and holder body are formed as an integral unit from a continuous piece of material.

3. The security tag holder of claim 1, wherein the flexible attachment member is a continuous unbroken flexible ring.

4. The security tag holder of claim 1, wherein the flexible attachment member is formed from silicone.

5. The security tag holder of claim 1, wherein the holder body has a front opening for providing access to the central cavity.

6. The security tag holder of claim 5, wherein the front opening has a greater cross-sectional area than the rear opening.

7. The security tag holder of claim 1, wherein the holder body is has a generally rectangular profile with the wings extending outward from opposed sides of the rectangular profile.

8. The security tag holder of claim 7, wherein the angled wings are formed by part of the flexible attachment member.

9. The security tag holder of claim 1, wherein the flexible attachment member and the holder body have the same hardness.

10. The security tag holder of claim 1, wherein the holder body is formed from a material that is more rigid than a material from which the flexible attachment member is formed.

11. The security tag holder of claim 1, wherein the holder body has a pair of front openings formed in a front of the holder body, the front being opposite the back, the central cavity being formed between the front and the back, the pair of front openings being separated by a support strip extending between opposed sides of the holder body.

12. The security tag holder of claim 11, wherein the flexible attachment member is a generally hoop shaped member, the hoop shaped member defining an opening therethrough, the hoop shaped member defining a central axis, the support strip extending generally parallel to the central axis.

13. The security tag holder of claim 1, wherein:
the first inward extending retaining flange defines a notch aligned with the first inward extending retaining lug; and
the second inward extending retaining flange defines a notch aligned with the second inward extending retaining lug.

14. The security tag holder of claim 1, wherein an inner surface of the angled wings is curved.

15. The security tag holder of claim 1, further comprising a security flange extending rearward from the holder body, the security flange and angled wings configured such that mounting of the holder body to a product with the angled wings proximate an outer sidewall of the product, the security flange will extend laterally over an end of the product.

16. A security tag assembly comprising:
a security tag holder of claim 1; and
a security tag positioned within the central cavity, the security tag includes:
a first attachment lug being positioned within the axial attachment gap between the first inward extending retaining flange and the first inward extending retaining lug; and
a second attachment lug being positioned within the axial attachment gap between the second inward extending retaining flange and the second inward extending retaining lug.

17. A security tag assembly comprising:
a security tag holder comprising:
a flexible attachment member;
a holder body defining a central cavity for holding a security tag, the holder body including a pair of angled wings on opposed ends of the holder body, the angled wings being oriented to cooperate with a portion of the outer periphery of product that is non-flat, the angled wings extending rearward of a back of the holder body, the holder body including a rear opening in the back thereof for extension of a push button therethrough; and
a security tag positioned within the central cavity, the security tag including a rearwardly extending contact button, the contact button extending through the rear opening and projecting from the back of the holder body.

18. The security tag assembly of claim 17, wherein the security tag is removably secured within the holder body of the security tag holder.

19. A retail merchandise package and security device comprising:
a retail merchandise package having a non-flat outer surface;
a security tag assembly of claim 17, the angled wings of the holder body cooperating with the non-flat outer surface of the retail merchandise package.

* * * * *